United States Patent
Kim et al.

(10) Patent No.: US 8,482,480 B2
(45) Date of Patent: Jul. 9, 2013

(54) MULTI DISPLAY SYSTEM AND MULTI DISPLAY METHOD

(75) Inventors: Young-chan Kim, Uiwang-si (KR); Byoung-in Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 694 days.

(21) Appl. No.: 12/367,874

(22) Filed: Feb. 9, 2009

(65) Prior Publication Data

US 2010/0001925 A1    Jan. 7, 2010

(30) Foreign Application Priority Data

Jul. 1, 2008  (KR) .................. 10-2008-0063643

(51) Int. Cl.
*G09G 5/00* (2006.01)

(52) U.S. Cl.
USPC .............. 345/1.1; 345/1.3; 345/903; 345/671

(58) Field of Classification Search
USPC ................ 345/1.1–1.3, 671, 903; 715/800
See application file for complete search history.

(56) References Cited

U.S. PATENT DOCUMENTS

| | | | | |
|---|---|---|---|---|
| 4,772,942 A | * | 9/1988 | Tuck | 348/38 |
| 5,129,028 A | * | 7/1992 | Soltan | 385/120 |
| 5,661,531 A | * | 8/1997 | Greene et al. | 349/73 |
| 5,956,000 A | * | 9/1999 | Kreitman et al. | 345/1.3 |
| 6,018,340 A | * | 1/2000 | Butler et al. | 715/764 |
| 6,501,441 B1 | * | 12/2002 | Ludtke et al. | 345/1.1 |
| 7,091,933 B2 | * | 8/2006 | McClintock et al. | 345/55 |
| 7,140,024 B2 | * | 11/2006 | Kaulgud et al. | 719/310 |
| 7,333,071 B2 | * | 2/2008 | Baudisch et al. | 345/1.3 |
| 7,475,356 B2 | * | 1/2009 | Baudisch et al. | 715/761 |
| 7,505,013 B2 | * | 3/2009 | Love | 345/2.1 |
| 7,546,540 B2 | * | 6/2009 | Baudisch et al. | 715/761 |
| 7,570,227 B2 | * | 8/2009 | MacKinlay | 345/1.3 |
| 7,573,462 B2 | * | 8/2009 | Ouchi | 345/157 |
| 7,592,970 B2 | * | 9/2009 | Matthies et al. | 345/1.3 |
| 7,629,945 B2 | * | 12/2009 | Baudisch | 345/1.3 |
| 7,667,707 B1 | * | 2/2010 | Margulis | 345/519 |
| 2002/0080302 A1 | * | 6/2002 | Dubin et al. | 349/73 |
| 2002/0167531 A1 | * | 11/2002 | Baudisch | 345/611 |
| 2004/0085256 A1 | * | 5/2004 | Hereld et al. | 345/1.1 |
| 2004/0222941 A1 | * | 11/2004 | Wong et al. | 345/1.1 |
| 2005/0052375 A1 | * | 3/2005 | Devos et al. | 345/82 |
| 2005/0057435 A1 | * | 3/2005 | Su | 345/1.3 |

(Continued)

FOREIGN PATENT DOCUMENTS

| | | |
|---|---|---|
| CN | 1467787 A | 1/2004 |
| CN | 1595488 A | 3/2005 |
| JP | 2005-134705 A | 5/2005 |

OTHER PUBLICATIONS

Communication, dated Apr. 1, 2013, issued by the State Intellectual Property Office of P.R. China in counterpart Chinese Patent Application No. 200910147782.0.

*Primary Examiner* — Lun-Yi Lao
*Assistant Examiner* — Kelly B Hegarty
(74) *Attorney, Agent, or Firm* — Sughrue Mion, PLLC (57) ABSTRACT

A multi display system which includes a plurality of display apparatuses in which partial images of an entire image are displayed is provided. The multi display system includes a plurality of display apparatuses which display partial images of an entire image, and an image distribution apparatus which generates the partial images based on a separation distance set between the partial images.

22 Claims, 10 Drawing Sheets

U.S. PATENT DOCUMENTS

| | | |
|---|---|---|
| 2006/0012951 A1* | 1/2006 | Kim .............................. 361/681 |
| 2008/0055189 A1* | 3/2008 | Wilk et al. ...................... 345/1.3 |
| 2009/0015513 A1* | 1/2009 | Kim et al. ....................... 345/1.3 |
| 2010/0097379 A1* | 4/2010 | Choi .............................. 345/428 |
| 2010/0128020 A1* | 5/2010 | Oh et al. ........................ 345/213 |
| 2010/0134384 A1* | 6/2010 | Kim et al. ....................... 345/1.3 |
| 2010/0328447 A1* | 12/2010 | Watson .......................... 348/135 |
| 2011/0102299 A1* | 5/2011 | Hochmuth et al. ............. 345/1.2 |
| 2011/0109526 A1* | 5/2011 | Bauza et al. .................... 345/1.3 |

* cited by examiner

FIG. 1A

THERE IS A DISTORTION

Prior Art

FIG. 1B

Prior Art

HORIZONTAL SIZE OF DISPLAY REGION : 8 0 0 0 mm

VERTICAL SIZE OF DISPLAY REGION : 6 0 0 0 mm

HORIZONTAL FRAME THICKNESS :  _ _ _ _ mm

VERTICAL FRAME THICKNESS :  _ _ _ _ mm

TOTAL NUMBER OF DISPLAY APPARATUS IN HORIZONTAL DIRECTION
TOTAL NUMBER OF DISPLAY APPARATUS IN VERTICAL DIRECTION
HORIZONTAL ORDER :  _ _ TH
VERTICAL ORDER :  _ _ TH

FIG. 4A

ENTIRE IMAGE

MULTI DISPLAY SYSTEM AND MULTI DISPLAY METHOD

CROSS-REFERENCE TO RELATED PATENT APPLICATION

This application claims priority from Korean Patent Application No. 10-2008-0063643, filed on Jul. 1, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to a multi display system, and more particularly, to displaying a plurality of partial images of an entire image using a natural display method according to a user's setting.

2. Description of the Related Art

A multi display system is a system for displaying an entire image as partial images on a plurality of display apparatuses. In methods for multi display, there are a full display method in which the multi display system displays the entire image as a partial images on the respective display apparatuses without considering separation distances of the plurality of the display apparatuses and a natural display method in which the multi display system displays the entire image as a partial images on the respective display apparatuses with considering separation distances of the plurality of the display apparatuses for preventing distortion of the entire image.

Figure 1A:
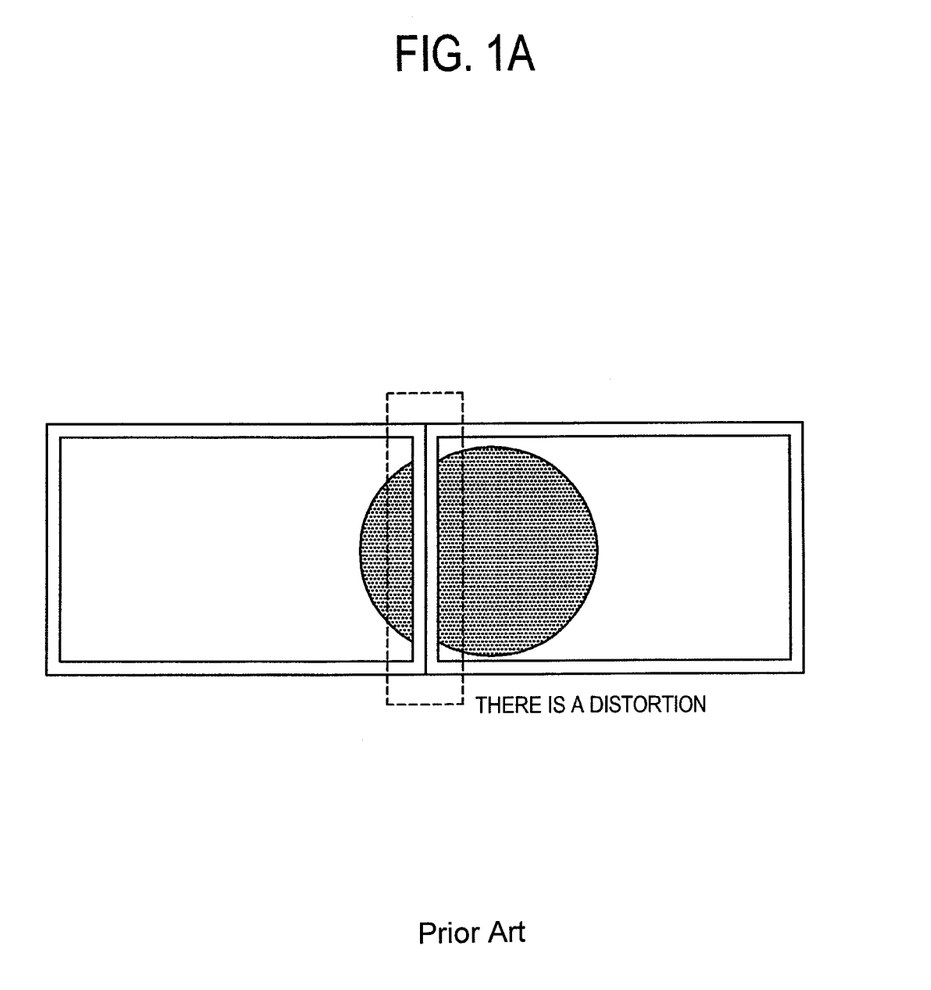
FIGS. 1A and 1B illustrate partial images displayed by a full display method and by a natural display method according to a related art multi display system.
Figure 1B:
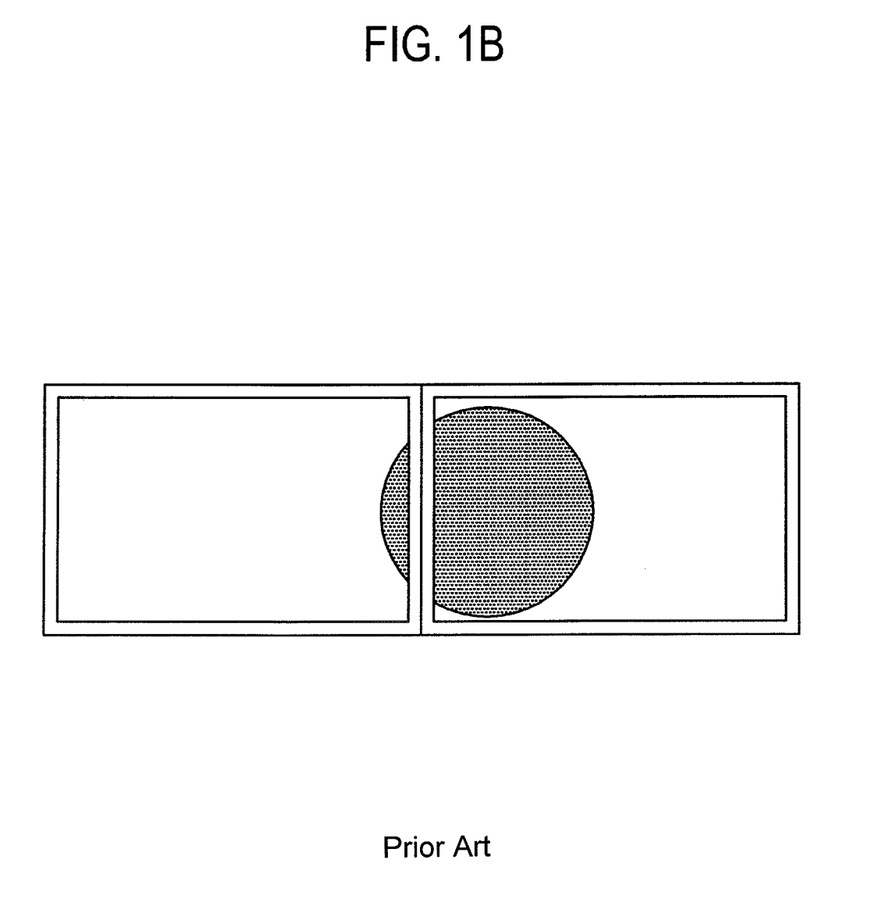

FIG. 1A illustrates partial images displayed by the full display method according to the related art. FIG. 1B illustrates partial images displayed by the natural display method according to the related art. Referring to FIG. 1A, distortion of the entire image appears in the partial images displayed by the full display method, because frames of the display apparatuses are not considered when generating the partial images. Referring to FIG. 1B, distortion of the entire image does not appear in the partial images displayed by the natural display method, because frames of the display apparatuses are considered when generating the partial images.

In the natural display method of the multi display system according to the related art, parameters such as an enlarge ratio and a capture position for generating partial images displayed on respective display apparatuses have fixed values during manufacture of the display apparatuses.

If a user changes frame thickness of the display apparatuses or the separation distance for adjusting the multi display system according to a user's preference, for example, the frames are eliminated and the multi display system is only composed of display panels of the display apparatuses or rearrangement of the display apparatuses in the multi display system is required for change of a space for installation, a user has no way to change the parameters.

SUMMARY OF THE INVENTION

An aspect of the present invention is to provide a multi display system of which a user sets frame thickness or the separation distance of the display apparatuses and the partial images are displayed according to the user's setting, and a multi display method thereof.

According to an aspect of the invention, there is provided a display apparatus comprising an image processing unit which processes a received entire image for a multi display system to generate a partial image for the display apparatus, a display unit which displays the partial image, a user input unit which receives a separation distance to set between partial images of the entire image, and a control unit which controls the image processing unit to process the entire image based on the input separation distance. The control unit may control the image processing unit to process the entire image with eliminating fraction of the entire image corresponding to the separation distance between the partial images. The separation distance may include at least one of frame thickness of the display apparatus and separation distance between display apparatuses included in the multi display system.

The user input unit may further receive a display order of the partial images of the entire image and the control unit controls the image processing unit to process the entire image based on the received display order of the partial images. The display order of the partial images may include at least one of the total number of the display apparatuses in the multi display system and a position of the display apparatus. The display unit may display an input menu for setting at least one of the separation distance and the display order. The display apparatus may further comprise an on screen display generating unit which generates the input menu.

According to an aspect of the invention, there is provided a multi display system may comprise a plurality of display apparatuses which display respective partial images of an entire image, and an image distribution apparatus which generates the partial images based on a separation distance to set between the partial images. The plurality of the display apparatuses may further comprise a user input unit which receives the separation distance to set. The image distribution apparatus may generate the partial images with eliminating fraction of the entire image corresponding to the separation distance between the partial images. The separation distance may include at least one of frame thickness of the plurality of the display apparatuses and separation distance between the display apparatuses.

The image distribution apparatus may further receive a display order of the partial images and generates the partial images based on the received display order of the partial images. The display order of the partial images may include at least one of the total number of the plurality of the display apparatuses and positions of the plurality of the display apparatuses. At least one of the plurality of the display apparatuses may display a input menu for setting at least one of the separation distance and the display order. The at least one of the plurality of the display apparatuses may further comprise an on screen display generating unit which generates the input menu. The image distribution apparatus may be provided in one of the plurality of the display apparatuses.

According to an aspect of the invention, there is provided a multi display method of a multi display system including a plurality of display apparatuses which comprising receiving a separation distance to set between a plurality of partial images of an entire image, processing the entire image for displaying the partial images on the respective display apparatuses based on the received separation distance, and displaying the partial images on the respective display apparatuses. The multi display method may further comprise processing the entire image with eliminating fraction of the entire image corresponding to the separation distance between the partial images. The separation distance may include at least one of frame thickness of the plurality of the display apparatuses and separation distance between the plurality of the display apparatuses.

The multi display method may further comprise receiving a display order of the plurality of the partial images, and processing the entire image based on the received display order of the plurality of the partial images. The display order of the plurality of the partial images may include at least one of the total number of the plurality of the display apparatuses and positions of the plurality of the display apparatuses. The multi display method may further comprise displaying an input menu for setting at least one of the separation distance and the display order. The multi display method may further comprise generating an on screen display generating unit which generates the input menu.

BRIEF DESCRIPTION OF THE DRAWINGS

The above and other aspects and features of the present invention will be apparent from the following detailed description of exemplary embodiments taken in conjunction with the accompanying drawings, in which.

DETAILED DESCRIPTION OF EXEMPLARY EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are merely specific details provided to assist those of ordinary skill in the art in a comprehensive understanding of the invention, and the present invention is only defined within the scope of the appended claims.

Figure 2:
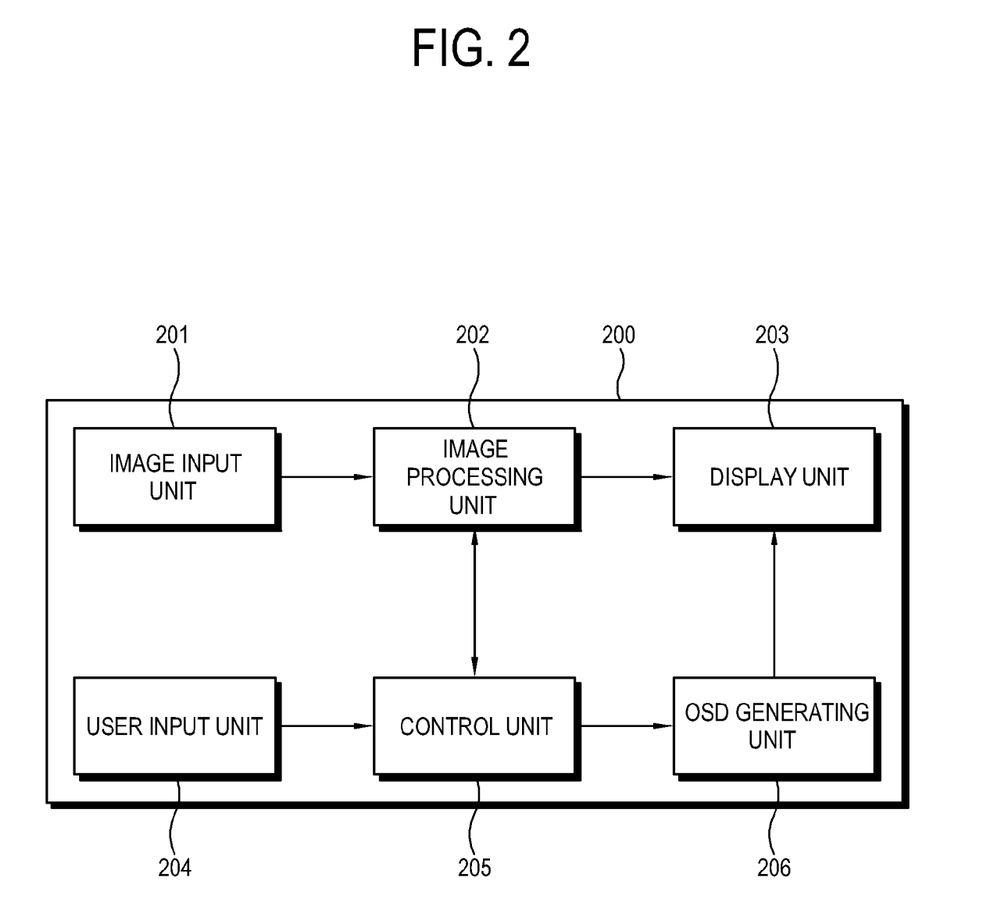
FIG. 2 illustrates a block diagram of a display apparatus having a multi display function according to an exemplary embodiment of the invention.

FIG. 2 illustrates a block diagram of a display apparatus 200 having a multi display function according to an exemplary embodiment of the present invention. The display apparatus 200 according to this exemplary embodiment of the present invention processes input images and displays the processed images, and may be implemented as a television, a monitor, etc.

The display apparatus 200 may be one of plurality of display apparatuses included in a multi display system. Hereinafter, an image which is displayed totally on the multi display system including the plurality of display apparatuses is referred to as an "entire image" and images which are displayed on respective display apparatuses included in the multi display system are referred to as "partial images".

Referring to FIG. 2, the display apparatus 200 includes an image input unit 201 which receives an image signal, an image processing unit 202 which processes the received image signal, a display unit 203 which displays the processed image signal by the image processing unit 202, a user input unit 204 which receives a user's setting, and a control unit 205.

The display apparatus 200 may further include an on-screen display (OSD) generating unit 206 which displays an input menu for receiving a user's setting on the display unit 203.

The image input unit 201 may include a tuner for receiving a image signal, such as a broadcast signal, and a connector which receives various kinds of image signals from a video cassette recorder (VCR), a digital versatile disk (DVD) player, a Blu-ray disc (BD), a personal computer (PC), etc.

The user input unit 204 includes a plurality of keys or buttons provided on exterior of the display apparatus 200. The buttons control respective functions of the display apparatus 200.

The user input unit 204 receives a user's setting for generating a partial image which is displayed on the display apparatus 200 from the entire image displayed on the multi display system according to an exemplary embodiment of the invention and sends the user's setting to the control unit 205.

The user's setting for generating a partial image displayed on the display apparatus 200 includes setting a frame thickness of the display apparatus 200 or a separation distance between display apparatuses included in the multi display system. The user's setting may further include a number of the display apparatuses included in the multi display system and positions of the display apparatus 200 in the multi display system.

The image processing unit 202 processes the received image signal by the image input unit 201 to display on the display unit 203. That is, the image processing unit 202 performs image processing such as image decoding, image enhancement, image scaling, contrast or brightness adjustment of the image. The image processing unit 202 processes the entire image signal to generate the partial images to be displayed on the display apparatus 200.

The control unit 205 controls the image processing unit 202 to generate the partial image to be displayed on the display apparatus 200 from the entire image according to the user's setting input by the user input unit 204. In detail, the control unit 205 calculates a capture region and an enlarge ratio of the partial image displayed on the display apparatus 200 from the entire image based on the user's setting such as the frame thickness of the display apparatus 200, which is input by the user input unit 204. The control unit 200 controls the image processing unit 202 to generate a partial image displayed on the display apparatus 200 according to the calculated capture region and enlarge ratio of the partial image.

The control unit 205 controls the OSD generating unit 206 to display the input menu for receiving the user's setting on the display unit 203.

Figure 3:
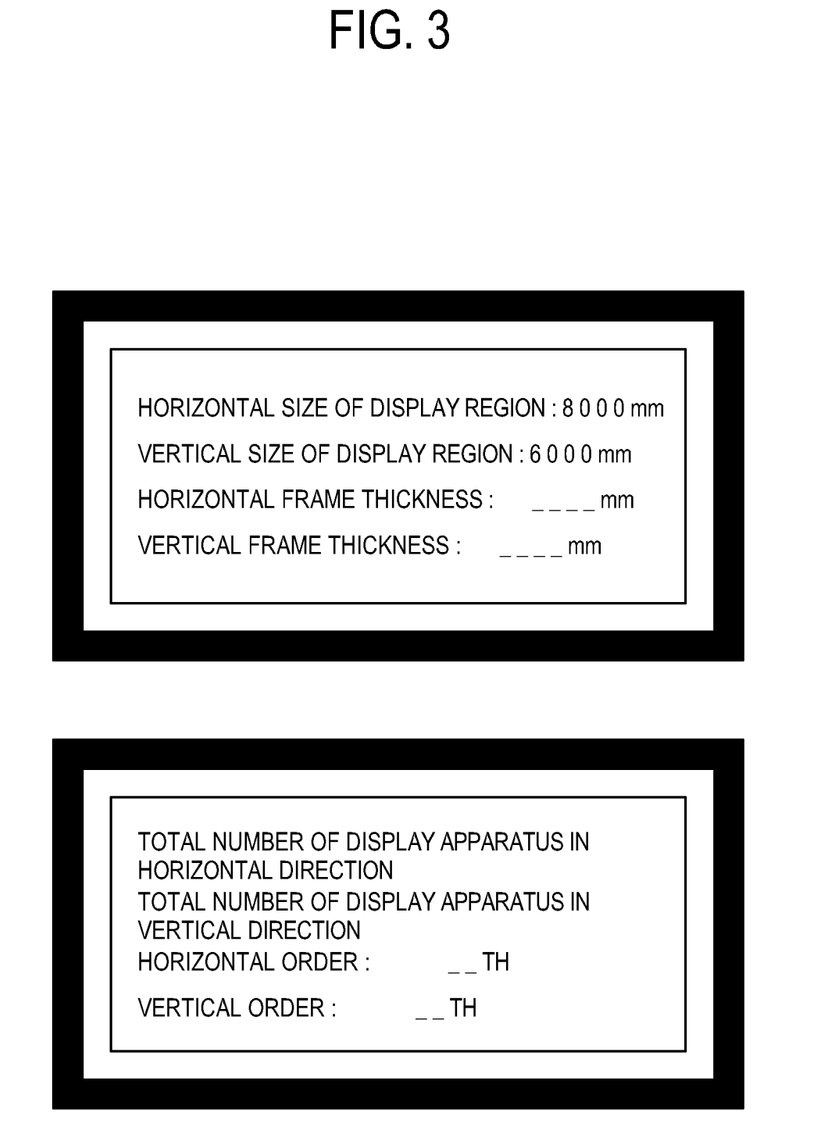
FIG. 3 illustrates input menu for receiving a user's setting according to an exemplary embodiment of the invention.

FIG. 3 illustrates an input menu for receiving a user's setting according to an exemplary embodiment of the invention.

Referring to FIG. 3, the input menu for receiving the user's setting includes items representing vertical and horizontal thicknesses of the frame and vertical and horizontal sizes of the display region of the display apparatus 200 included in the multi display system. If the display apparatus 200 has fixed values for the vertical and horizontal sizes of the display region, a user does not need to set for the items. The input menu for receiving the user's setting may further include items representing total numbers of the display apparatuses included in the multi display system in vertical and horizontal directions and vertical and horizontal orders of the display apparatus 200.

Hereinafter, referring to FIGS. 4A to 4E, a process for calculating the capture region and the enlarge ratio of the partial image displayed on the display apparatus 200 in the entire image displayed on the multi display system is explained.

For example, a multi display system which includes four display apparatuses comprising the display apparatus 200 according to an exemplary embodiment of the invention is used for explanation. The separation distance between display apparatuses is assumed to be the frame thicknesses of the display apparatuses, horizontal frame thicknesses of left sides and right sides of the respective display apparatuses are assumed to be same, and vertical frame thicknesses of upper sides and lower sides of the respective display apparatuses are assumed to be same. However, the invention is not limited to this example.

Figure 4A:
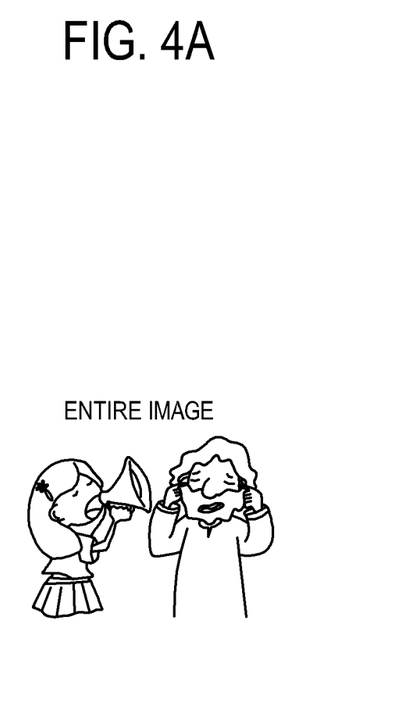
FIG. 4A to 4E illustrate calculation of a horizontal capture region of partial images and a horizontal enlarge ratio according to an exemplary embodiment of the present invention.
Figure 4B:
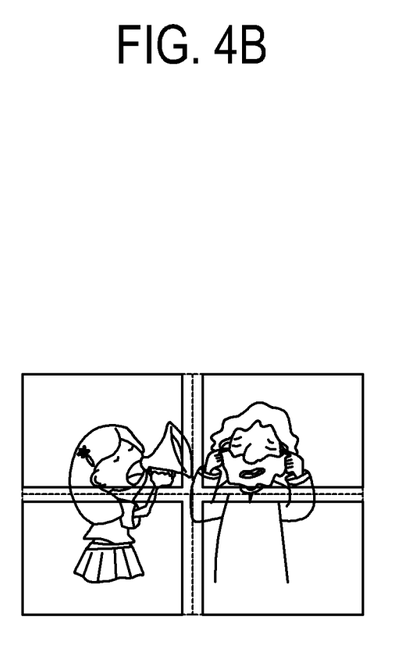

FIG. 4A illustrates an entire image displayed on the multi display system according to an exemplary embodiment of the invention. FIG. 4B illustrates partial images displayed on the respective display apparatuses if the entire image is displayed using the natural display method. Four rectangular regions outlined by solid lines in FIG. 4B represent respective partial images. A portion of the entire image which is outside of the four rectangular regions is not displayed on the display apparatuses.

Figure 4C:
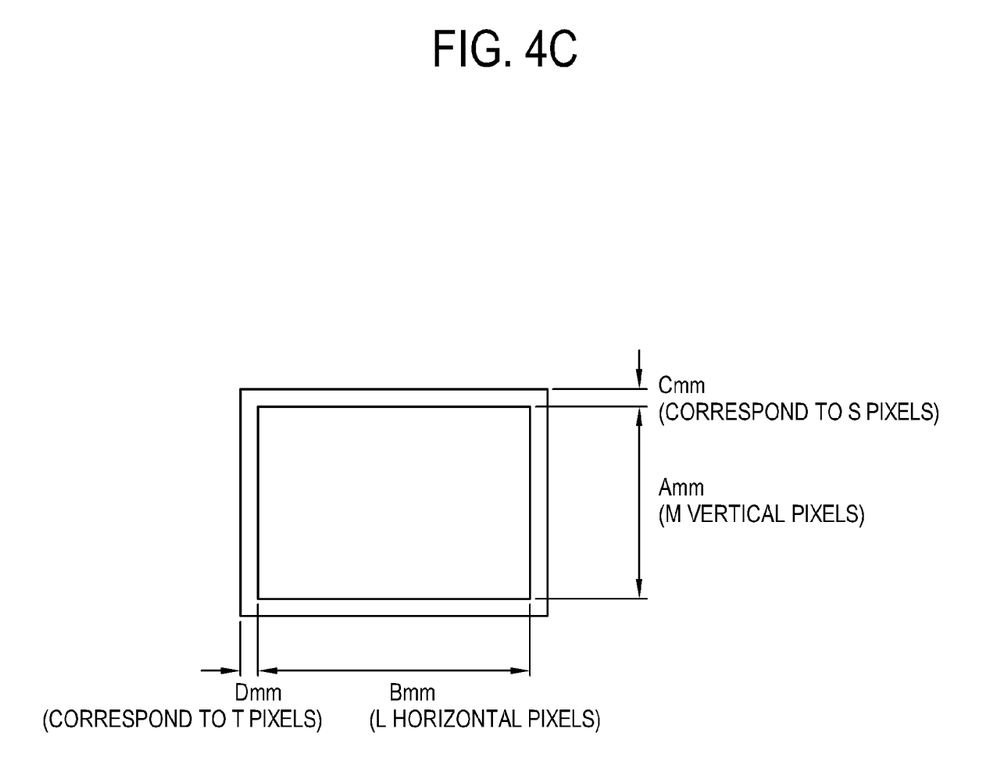

FIG. 4C illustrates exemplary calculation of the frame thickness of the display apparatus 200 as a number of pixels according to an exemplary embodiment of the invention. Referring to FIG. 4C, T pixels which corresponds to the horizontal frame thickness of the display apparatus 200 may be calculated by Equation (1) below.

$$T = (L*D)/B \quad (1).$$

In Equation (1), T is the number of pixels corresponding to the horizontal frame thickness of the display apparatus 200, L is the number of horizontal pixels of a display panel of the display apparatus 200, D is the horizontal frame thickness of the display apparatus 200, and B is the horizontal length of the display panel of the display apparatus 200.

S pixels which correspond to the vertical frame thickness of the display apparatus 200 may be calculated by the same method as the T pixels. Equation (1) may be substituted by Equation (1-1) below.

$$S = (M*C)/A \quad (1\text{-}1).$$

In Equation (1-1), S is the number of pixels corresponding to the vertical frame thickness of the display apparatus 200, M is the number of vertical pixels of a display panel of the display apparatus 200, C is the vertical frame thickness of the display apparatus 200, and A is the vertical length of the display panel of the display apparatus 200.

Figure 4D:
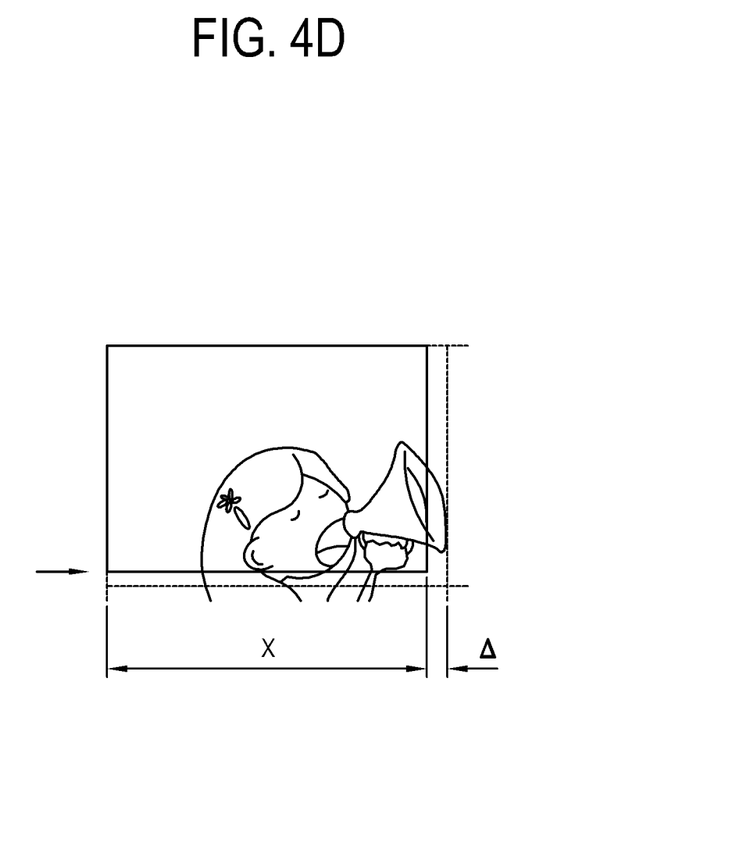

FIG. 4D illustrates exemplary calculation of the number of horizontal pixels for a partial image displayed on one display apparatus among the total pixels of the entire image displayed on the multi display system and the number of pixels for the horizontal frame of one display apparatus among the total pixels of the entire image displayed on the multi display system according to an exemplary embodiment of the invention. Referring to FIG. 4D, X horizontal pixels for the partial image displayed on one display apparatus and Δ pixels for the horizontal frame of one display apparatus may be calculated by Equation (2) and Equation (3) below.

$$X = L*R/(L*N + 2*(N-1)*T) \quad (2).$$

$$\Delta = T*X/L \quad (3).$$

In Equations (2) and (3), X is the number of horizontal pixels for the partial image displayed on the one display apparatus among the total pixels of the entire image, L is the number of horizontal pixels of a display panel of the display apparatus 200, R is the total number of horizontal pixels of the entire image, N is the total number of display apparatuses included in the multi display system in a horizontal direction, T is the number of pixels corresponding to the horizontal frame thickness of the display apparatus 200, which is the value calculated in Equation (1), and Δ is the number of horizontal pixels for the horizontal frame of the one display apparatus among the total pixels of the entire image.

Figure 4E:
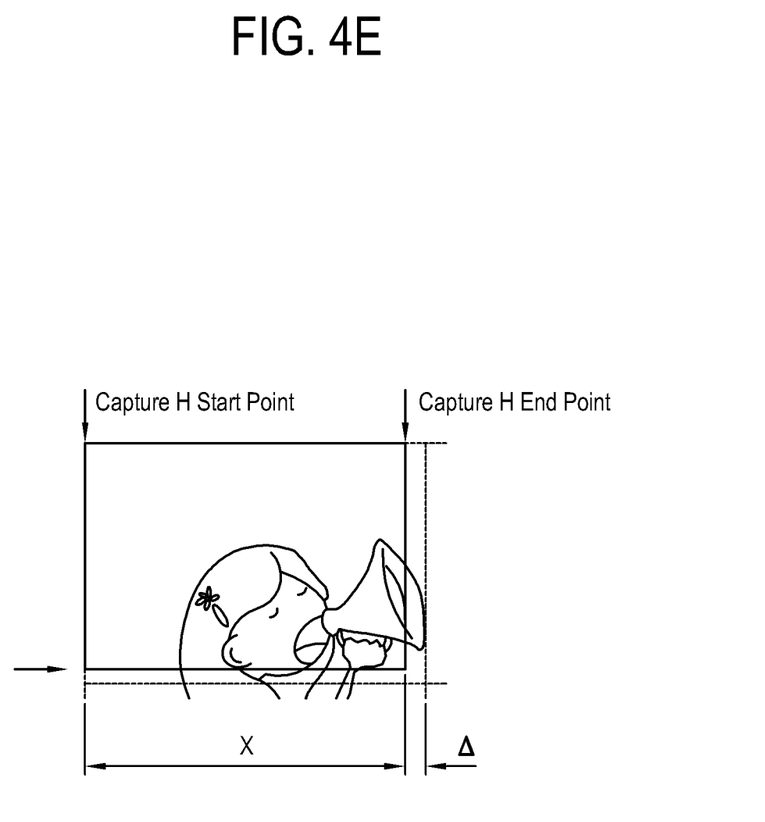

FIG. 4E illustrates exemplary calculation of the horizontal capture region for each partial image in the entire image and calculation of the horizontal enlarge ratio of the partial image according to an exemplary embodiment of the invention. Referring to FIG. 4E, Cns which is a pixel position of a starting pixel for 'n' th partial image in horizontal direction and Cne which is a pixel position of an ending pixel for the 'n' th partial image in horizontal direction, wherein 'n' is integer between 1 to N which is the total number of the display apparatuses in the multi display system in horizontal direction, may be calculated by Equation (4-1) and Equation (4-2) below.

$$Cns = (X + 2\Delta)*(n-1) \quad (4\text{-}1).$$

$$Cne = (X + 2\Delta)*(n-1) + X \quad (4\text{-}2).$$

In Equations (4-1) and (4-2), Cns is a pixel position of a starting pixel for 'n' th partial image in horizontal direction, X is the number of horizontal pixels for a partial image displayed on one display apparatus among the total pixels of the entire image, which is calculated by Equation (2), Δ is the number of horizontal pixels for a horizontal frame of one display apparatus among the total pixels of the entire image, which is calculated by Equation (3), 'n' is the order of a display apparatus among the display apparatuses in the multi display system in horizontal direction, and Cne is a pixel position of an ending pixel for the 'n' th partial image in horizontal direction.

The horizontal enlarge ratio of a partial image may be calculated by a ratio between the number of horizontal pixels X for a partial image and the number of horizontal pixels of a display panel of a display apparatus.

Equations (2), (3), (4-1), and (4-2) are explained for a horizontal direction. However, the same calculating method as the equations may be used for a vertical direction.

A process for generating partial images from the entire image may be performed in various ways. In a first exemplary embodiment, the entire image is input to respective display apparatuses and the display apparatuses generate respective partial images using the entire image according to the user's setting. In a second exemplary embodiment, an external device such as a PC or set top box generates partial images from the entire image and sends the partial images to respective display apparatuses. In a third exemplary embodiment, one of the display apparatuses in the multi display system generates the partial images from the entire image and sends the partial images to other respective display apparatuses.

Figure 5:
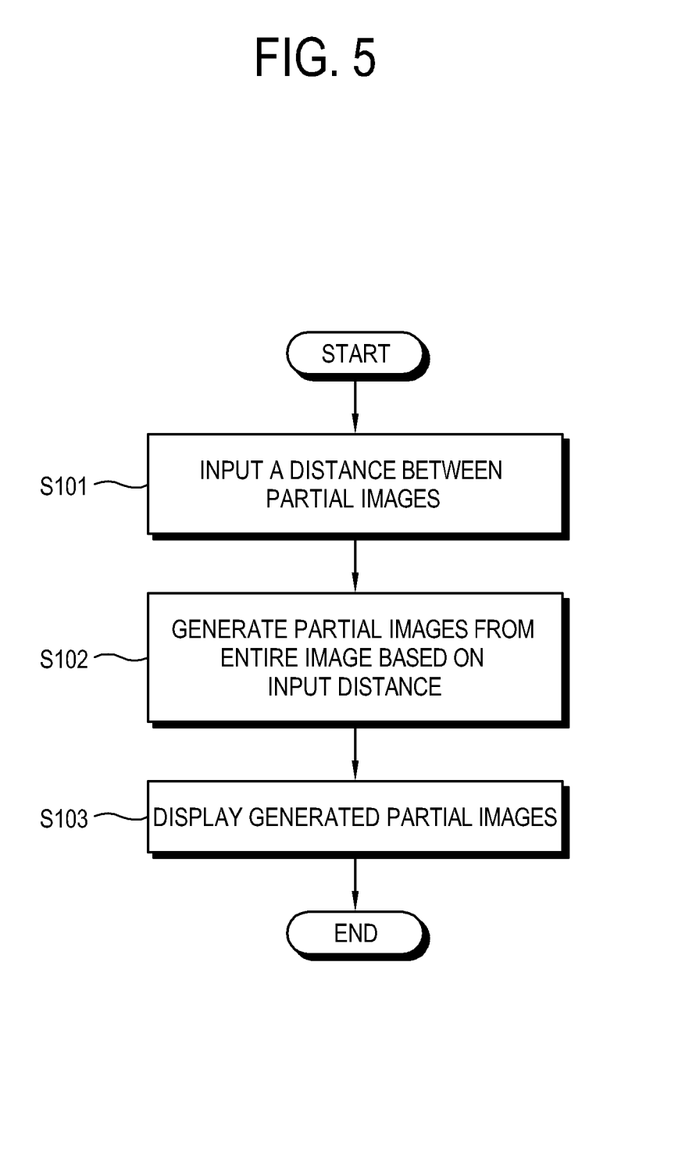
FIG. 5 is a flow chart of a multi display method according to an exemplary embodiment of the present invention.

FIG. 5 illustrates a flow chart of a multi display method according to an exemplary embodiment of the invention.

Referring to FIG. 5, a user sets a separation distance between partial images included in the multi display system (S101). The display apparatuses or an image distribution device generates partial images from the entire image based on the input separation distance (S102). The generated partial images are displayed on respective display apparatuses (S103).

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A display apparatus comprising:
   an image processing unit which processes an entire image for a multi display system to generate a partial image for the display apparatus;
   a display unit which displays the partial image;
   a user input unit through which a separation distance between partial images of the entire image is input by a user; and
   a control unit which controls the image processing unit to process the entire image based on the separation distance which is input,
   wherein the control unit calculates a capture region and an enlarge ratio of the partial images based on the separation distance input by the user, and controls the image processing unit to generate the partial image according to the calculated the capture region and the enlarge ratio,
   wherein the capture region is a region of a partial image that is calculated using the separation distance and by determining a starting pixel and an ending pixel of the partial image displayed on one display apparatus of the multi-display system.

2. The display apparatus of claim 1, wherein the control unit controls the image processing unit to process the entire image to eliminate a portion of the entire image corresponding to the separation distance between the partial images.

3. The display apparatus of claim 1, wherein the separation distance includes at least one of a frame thickness of the display apparatus and a separation distance between display apparatuses included in the multi display system.

4. The display apparatus of claim 1, wherein the user input unit further receives a display order of the partial images of the entire image and the control unit controls the image processing unit to process the entire image based on the display order of the partial images.

5. The display apparatus of claim 4, wherein the display order of the partial images includes at least one of a total number of display apparatuses in the multi display system and a position of the display apparatus.

6. The display apparatus of claim 4, wherein the display unit displays an input menu for setting at least one of the separation distance and the display order.

7. The display apparatus of claim 6 further comprising an on-screen display generating unit which generates the input menu.

8. A multi display system comprising:
   a plurality of display apparatuses which respectively display partial images of an entire image;
   a user input unit through which a separation distance is input by a user; and
   an image distribution apparatus which generates the partial images based on a separation distance set between the partial images,
   wherein the image distribution apparatus calculates a capture region and an enlarge ratio of the partial images based on the separation distance input by the user, and generates the partial image according to the calculated the capture region and the enlarge ratio,
   wherein the capture region is a region of a partial image that is calculated using the separation distance and by determining a starting pixel and an ending pixel of the partial image displayed on one display apparatus of the multi-display system.

9. The multi display system of claim 8, wherein the image distribution apparatus generates the partial images with a portion of the entire image corresponding to the separation distance between the partial images being eliminated.

10. The multi display system of claim 8, wherein the separation distance includes at least one of a frame thickness of the plurality of the display apparatuses and a separation distance between the display apparatuses.

11. The multi display system of claim 8, wherein the image distribution apparatus further receives a display order of the partial images and generates the partial images based on the display order of the partial images.

12. The multi display system of claim 11, wherein the display order of the partial images includes at least one of a total number of the plurality of the display apparatuses and positions of the plurality of the display apparatuses.

13. The multi display system of claim 11, wherein at least one of the plurality of the display apparatuses displays a input menu for setting at least one of the separation distance and the display order.

14. The multi display system of claim 13, wherein the at least one of the plurality of the display apparatuses further comprises an on-screen display generating unit which generates the input menu.

15. The multi display system of claim 8, wherein the image distribution apparatus is provided in one of the plurality of the display apparatuses.

16. A multi display method of a multi display system including a plurality of display apparatuses, comprising:
   receiving a separation distance to set between a plurality of partial images of an entire image from a user;
   processing the entire image for displaying the partial images on the display apparatuses based on the separation distance which is received; and
   displaying the partial images on the display apparatuses,
   wherein the processing the entire image for displaying the partial images comprises:
   calculating a capture region and an enlarge ratio of the partial images based on the separation distance received from the user, and
   generating the partial image according to the calculated the capture region and the enlarge ratio,
   wherein the capture region is a region of a partial image that is calculated using the separation distance and by determining a starting pixel and an ending pixel of the partial image displayed on one display apparatus of the multi-display system.

17. The multi display method of claim 16, further comprising processing the entire image with eliminating fraction of the entire image corresponding to the separation distance between the partial images.

18. The multi display method of claim 16, wherein the separation distance includes at least one of a frame thickness of the plurality of the display apparatuses and a separation distance between the plurality of the display apparatuses.

19. The multi display method of claim 16, further comprising:
   receiving display order of the plurality of the partial images from the user; and
   processing the entire image based on the display order of the plurality of the partial images.

20. The multi display method of claim 19, wherein the display order of the plurality of the partial images includes at least one of a total number of the plurality of the display apparatuses and positions of the plurality of the display apparatuses.

21. The multi display method of claim 19, further comprising displaying an input menu for setting at least one of the separation distance and the display order.

22. The multi display method of claim 21, further comprising generating an on-screen display generating unit which generates the input menu.

* * * * *